United States Patent [19]

Stillmunkes

[11] 4,400,002
[45] Aug. 23, 1983

[54] OPERATOR MOUNTING STEP FOR TRACK-LAYING VEHICLES

[75] Inventor: Dean J. Stillmunkes, Dubuque, Iowa

[73] Assignee: Deere & Company, Moline, Ill.

[21] Appl. No.: 262,092

[22] Filed: May 11, 1981

[51] Int. Cl.³ .............................................. B60R 3/04
[52] U.S. Cl. .................................. 280/164 A; 182/90
[58] Field of Search ............... 280/163, 164 R, 164 A, 280/166, 169; 180/9.2 R; 296/62; 182/90; D12/203

[56] References Cited

U.S. PATENT DOCUMENTS

| | | | |
|---|---|---|---|
| 919,278 | 4/1909 | Yeager, Jr. ............................ | 182/90 |
| 1,091,798 | 3/1914 | Booraem et al. ................. | 182/90 X |
| 1,415,699 | 5/1922 | Porter ................................ | 182/90 |
| 1,505,015 | 8/1924 | Dunlap, Jr. ...................... | 182/90 X |
| 1,760,200 | 5/1930 | Large ................................. | 182/90 |
| 2,226,489 | 12/1940 | Doherty .............................. | 182/90 |
| 2,820,667 | 1/1958 | Benaroya et al. ............. | 280/163 X |
| 3,171,671 | 3/1965 | Cornett ........................... | 280/163 |
| 3,191,709 | 6/1965 | Symons .......................... | 280/163 X |
| 3,378,278 | 4/1968 | Froitzheim et al. ............... | 280/163 |
| 3,710,886 | 1/1973 | Wagner ........................... | 180/9.2 R |
| 3,776,094 | 12/1973 | Gilles et al. ................. | 280/164 R X |
| 4,121,691 | 10/1978 | Poplawski ...................... | 280/163 X |

Primary Examiner—Joseph F. Peters, Jr.
Assistant Examiner—Michael Mar

[57] ABSTRACT

An operator's mounting step structure for a crawler-tractor includes a step housing having a floor or bottom formed by a downwardly and outwardly inclined surface of a track-tensioner recoil spring housing. The surface of the housing inclines downwardly and outwardly and a primary step is spaced above an outer portion of this surface so as to leave a gap between the foot-engageable member and the surface to prevent dirt and mud and the like to gravitate down the surface of the housing and through the gap. The housing of the step structure further includes a top wall which has a forward upturned lip which forms a secondary step spaced vertically above the primary step. The top wall is curved downwardly and inwardly from the upturned lip thereof and it joins the recoil spring housing at an inward location of the downward and outwardly inclined surface.

3 Claims, 3 Drawing Figures

U.S. Patent  Aug. 23, 1983  4,400,002
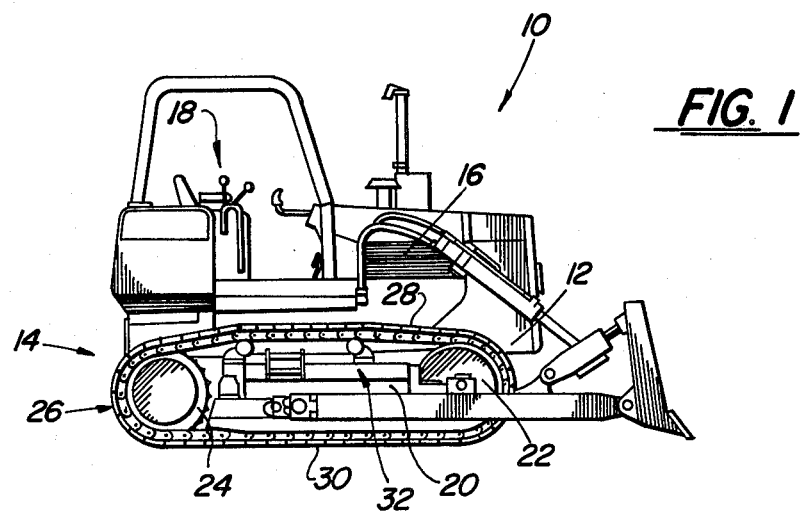
FIG. 1
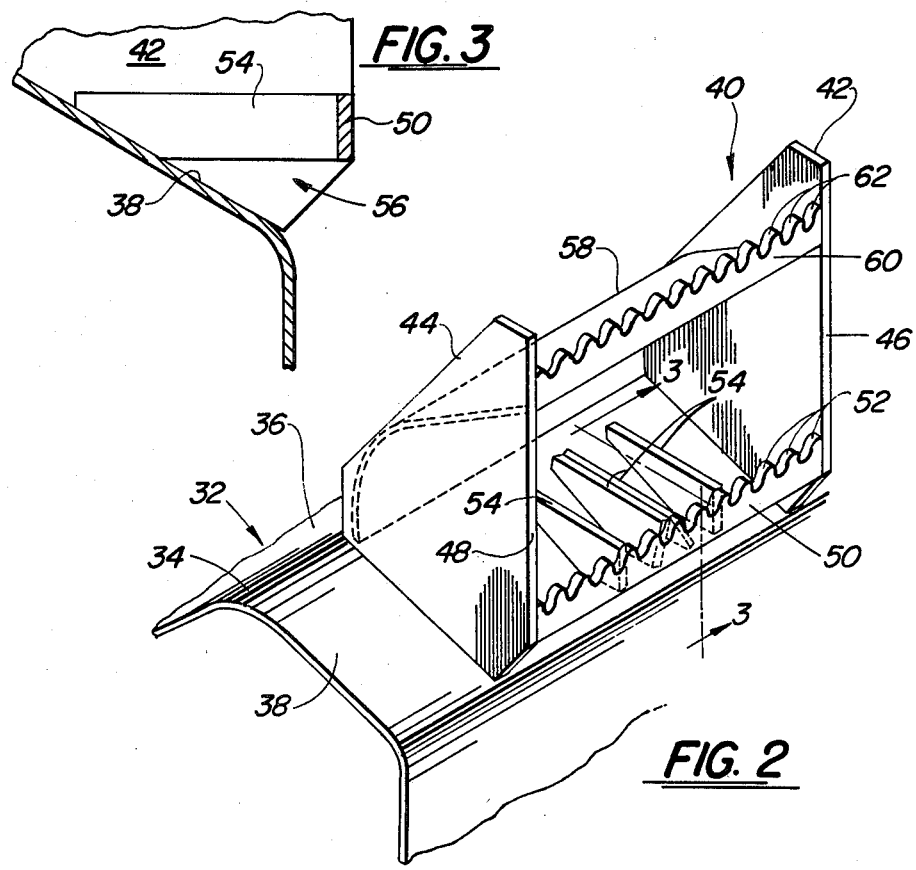
FIG. 3
FIG. 2

OPERATOR MOUNTING STEP FOR TRACK-LAYING VEHICLES

BACKGROUND OF THE INVENTION

The present invention relates to mounting step structures or assemblies for track-laying vehicles and more particularly relates to step structures which are mounted within the area circumscribed by the endless tracks of a track-laying vehicle. In application Ser. No. 25,696, filed on Apr. 2, 1979 by J. Link (and now abandoned), there is disclosed a step structure including a foot-engageable strap mounted on the top of a recoil spring cover and located within a step housing having a top which inclines downwardly and inwardly from a location spaced vertically above the foot-engageable strap.

While the step structure disclosed in the above-identified patent application operates generally satisfactorily in that it prevents mud from being carried over onto the foot-engageable strap by the endless track, it has been found that mud and dirt carried into the step housing by the shoes of an operator will often become deposited behind the foot-engageable strap and thus be trapped within the housing.

Further, it has been found that operators using the step disclosed in the patent application will sometimes step on top of the step housing and this is not altogether satisfactory since the housing top or the operator's foot may be covered with mud and result in his slipping sideways from the top.

SUMMARY OF THE INVENTION

According to the present invention, there is provided an improved mounting step structure or assembly for use on track frames of a track-laying tractor and more particularly, there is provided a mounting step structure which represents an improvement over the structure disclosed in the aforementioned application Ser. No. 25,696.

An object of the invention is to provide a step structure of the type described herein above which is of a simple reliable construction.

A more specific object of the invention is to provide a step structure including a step housing having a top inclined downwardly and inwardly to shed mud and dirt and the like and which includes a bottom or floor formed by a downwardly and outwardly inclined surface of a track-tensioner spring cover, the floor extending beneath a foot-engageable strap of the step structure.

A further object of the invention is to provide a step structure including a housing disposed to keep mud from falling on a primary foot-engageable strap and including a secondary step formed by the top of the housing at a location spaced vertically above the primary foot-engageable portion.

These and other objects will become apparent from a reading of the ensuing description, together with the appended drawings.

BRIEF DESCRIPTION OF THE DRAWINGS

FIG. 1 is a right side elevational view showing a crawler-tractor provided with a mounting step structure constructed in accordance with the principles of the present invention.

FIG. 2 is a right rear perspective view of the mounting step structure of the present invention.

FIG. 3 is a partial sectional view of the mounting step structure taken along line 3—3 of FIG. 2.

DESCRIPTION OF THE PREFERRED EMBODIMENT

Referring now to FIG. 1 of the drawings, therein is shown a track-laying tractor 10 including a main frame 12 supported by a pair of track frame assemblies 14 (only one visible) located at the opposite sides thereof. Located forwardly on the frame 12 is an engine compartment 16. An operator's station 18 is located on the frame 12 behind the compartment 16.

The track assemblies 14 each include a fore-and-aft elongated track frame 20 having an idler wheel 22 mounted at the forward end of the frame 20 for fore-and-aft movement and a drive sprocket 24 supported by the frame 12 and disposed at the rear end of the frame 20 in fore-and-aft alignment with the idler wheel 22. An endless track 26 is disposed about the idler wheel 22 and drive sprocket 24 and includes upper and lower runs 28 and 30, respectively, disposed vertically above and below the frame 20. A recoil assembly (not shown) is provided between the front idler wheel 22 and the frame 20 in a manner well-known in the art and an inverted V-shaped cover plate 32 is provided for covering parts of the mechanism of the recoil assembly.

As can best be seen in FIG. 3, the housing 32 includes an apex 34 which extends longitudinally within the track 26 so that an inner top surface 36 of the housing inclines downwardly and inwardly while a top surface 38 of the housing inclines downwardly and outwardly.

The recoil spring housing 32 and particularly the surface 38 thereof cooperates to form part of a mounting step structure or assembly 40 located in transverse alignment with an operator access passage of the operator's station 18. Specifically, the step structure 40 includes parallel, generally triangular, vertically disposed, front and rear end plates 42 and 44, respectively. The end plates 42 and 44 respectively have front edges 46 and 48 and extending between the plates 42 and 44 and joined thereto so as to be flush with the edges 46 and 48 is a primary stop or foot-engageable member 50 in the form of a strap having a non-skid surface on the top thereof formed by a series of serrations 52. A plurality of horizontal support straps 54 extend inwardly from the step 50 and are joined to the housing 32 at respective locations on the surface 38. The step 50 is spaced upwardly and outwardly from the outer edge of the housing surface 38 and thus, a gap 56 exists between the surface 38 and the member 50. The gap 56 provides an opening through which mud and dirt carried into the housing by an operator may pass as it gravitates down the inclined surface 38 of the housing 32. The step housing further includes a top wall 58 located between and joined to the end plates 42 and 44 and being curved downwardly and inwardly from a location spaced vertically above the step 50 to a location spaced just outboard of the apex 34 of the recoil spring housing 32. The outer end of the top wall 58 is upturned to form a lip which provides a secondary step 60 disposed vertically above the primary step 50. A plurality of serrations 62 are provided on the top edge of the lip so as to provide a nonslip surface. It is also to be noted that the end walls 46 and 48 extend up beyond the top of the secondary step 60 so as to prevent an operator's foot from slipping off the side of the secondary step.

The operation of the invention is thought to be evident from the foregoing description thereof and for the sake of brevity, no further description is given.

I claim:

1. In a vehicle mounting step structure formed in part by an inverted V-shaped track tensioner cover plate having an apex extending longitudinally within an area circumscribed by an endless track of a track-laying vehicle and further including a longitudinally extending foot-engageable strap joined to the cover plate and disposed within a step housing having vertical, longitudinally spaced end walls joined to the cover plate at opposite ends of the strap and having a top inclined downwardly and inwardly from a location vertically above the strap to the cover and joined to the end wall and the cover, the improvement comprising: said top having an upturned outward lip located vertically above the strap so as to form a secondary foot-engageable support, said strap being elevated above the cover plate and joined to the end walls, which serve to join the strap to the cover plate, whereby material carried to the top of the step housing slides inwardly down the top and material which happens to find its way into the housing slides outwardly on the cover plate beneath the strap.

2. The vehicle mounting step structure defined in claim 1 wherein the strap and upturned lip have respective serrated upper edges providing non-slip surfaces for foot engagement.

3. The vehicle mounting step structure defined in claim 1 wherein the end walls of the step housing are located beside opposite end portions of the upturned lip to thereby prevent one from slipping sideways off the lip.

* * * * *